Nov. 12, 1957   T. A. LANCASTER   2,813,052
COMPOSITE MOISTURE-PROOF PLASTICIZED
FABRIC AND METHOD OF MAKING THE SAME
Filed Feb. 11, 1952
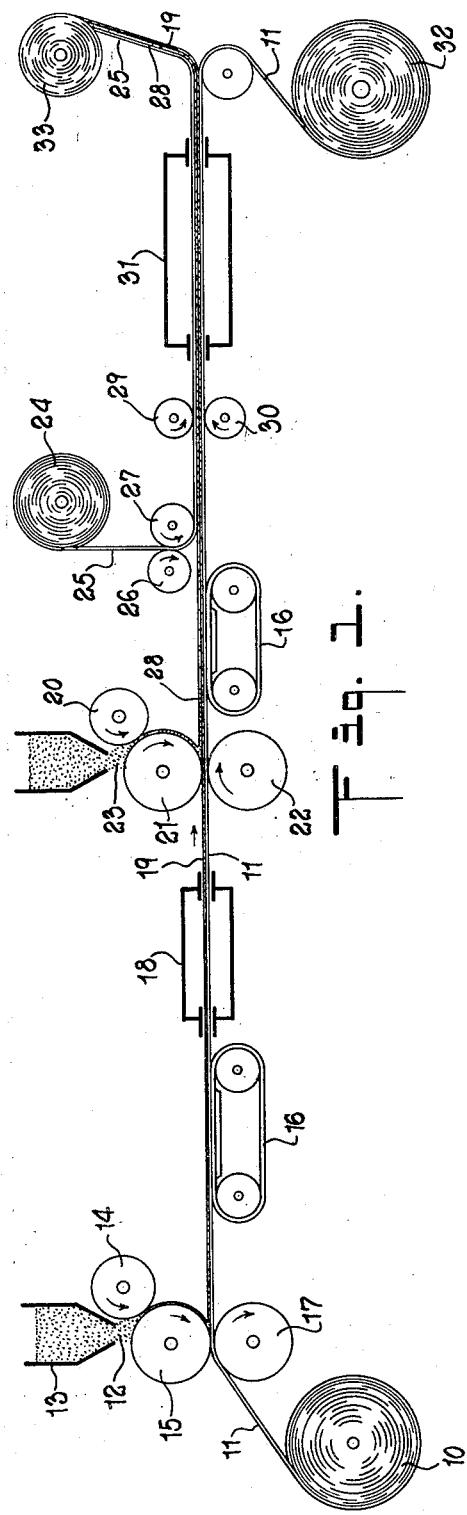
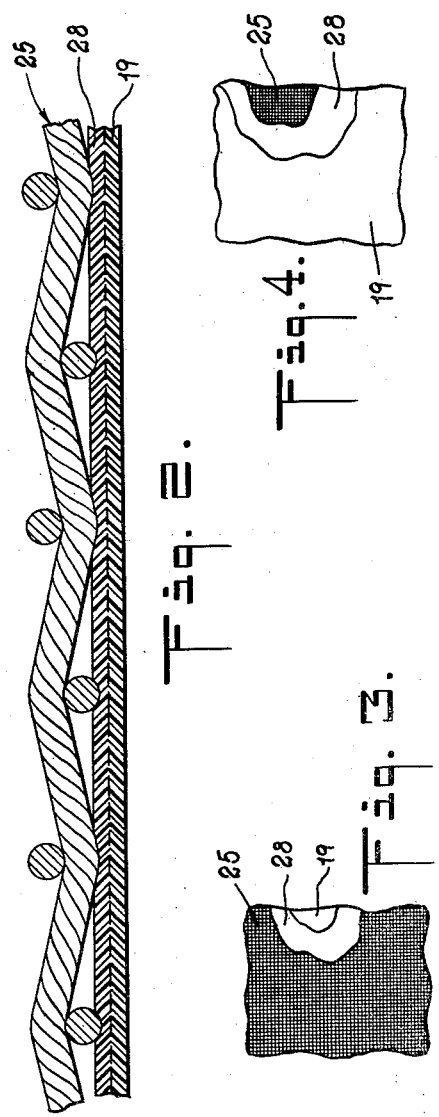
INVENTOR
TALBOT A. LANCASTER
BY
ATTORNEY

United States Patent Office 2,813,052
Patented Nov. 12, 1957

2,813,052

COMPOSITE MOISTURE-PROOF PLASTICIZED FABRIC AND METHOD OF MAKING THE SAME

Talbot A. Lancaster, Canterbury, Conn., assignor to Plastic Film Corporation, Plainfield, Conn., a corporation of Delaware Application February 11, 1952, Serial No. 270,950

16 Claims. (Cl. 154—95)

This invention relates to non-porous and water-proof fabrics, and more especially to knitted, netted or textile fabrics which have substantial stretchability in all directions.

The principal object of the invention is to provide an improved composite knitted, netted or textile fabric which carries an integrally bonded water-proof layer.

Another object is to provide an improved water-proof composite fabric which is particularly well-suited for the manufacture of articles of personal wear.

A further object is to provide an improved water-proof composite fabric of knitted, netted or textile material carrying an integrally printed design.

Various kinds of water-proof composite materials have been proposed heretofore of which so-called rubberized cloth is typical.

One known method of making such a fabric is to pass a previously prepared dry plastic film in contact with the fabric around a heated drum, against which both are pressed by a heater blanket. Since the plastic film is of extreme thinness, for example not over 0.002 inch, and since the fabric is very much thicker, the passage of both around the drum under heat and pressure causes the crests or crossover points of the fabric to distort the film so that it assumes a surface contour which conforms somewhat to the surface contour of the fabric. That is to say, in the normal or unstretched condition of the prior composite article, the plastic surface exhibits ridges resulting from the impression of the warp and weft strands to which it is attached. It is desirable in certain cases to have, and the present invention provides, a composite fabric, one surface of which both in the normal and in the stretched state is perfectly smooth, while the opposite surface has the physical appearance and feels to the touch as a normal woven, knitted, or netted fabric of any of the usual textile materials.

While it is possible to impregnate a woven fabric with a plastic material, it is necessary to use a relatively great thickness of the impregnating material to avoid the existence of pin holes while preserving a perfectly smooth surface on one face of the article. If the impregnating pressure and the fluidity of the impregnating batch are not closely correlated with the porosity of the woven fabric, there is always the possibility of the impregnating material being forced through the fabric and showing on the reverse side thereof so as to produce a spotted or non-uniform appearance. With such impregnating methods the finished article is undesirably stiffened. Furthermore, when impregnating a fibrous fabric with a viscous material, because of the unavoidable surface irregularity and protruding character of the individual fibers they tend to extend through the viscous material and appear as uncoated points. Therefore, when the finished impregnated fabric is stripped from any backing, the uncoated fibers may be sufficiently mechanically inter-locked with the backing as to cause tearing or uneven stripping action.

The present invention provides a method of producing a composite, water-proof characteristic and woven or knitted characteristic by employing a minimum number of plastic coating operations, in most cases not more than two. It is desirable to have one side of the finished article exhibit a woven or knitted appearance, and for that reason the impregnation of the body, or the coating of both sides is not desirable. In other words, it is an object of this invention to provide a water-proof fabric which, when viewed from one of its sides, exhibits, and feels like, a true knitted, woven or netted material while the opposite side has a perfectly smooth face of a film-forming resin which is free from pin holes or other surface irregularities. According to the invention, the process is controlled so that the surface irregularities of the woven material are not apparent on the said smooth surface of the finished article.

A feature of the invention relates to a composite woven or open-work fabric having a facing of a film-forming resin integrally bonded both to the crests and troughs of the adjacent fabric strands on one side of the fabric, and wherein the opposite side is free from the resin so as to exhibit the normal woven fabric appearance.

Another feature relates to a composite woven or open-work fabric, having integrally bonded thereto a water-proof layer constituted of a first stratum which extends only part way through the body of the fabric, and a second stratum which overlies and is integrally bonded to the first stratum.

A further feature relates to the novel combination of method steps for forming an improved water-proof composite fabric.

A still further feature relates to the novel organization, arrangement and relative location of parts which cooperate to form an improved water-proof composite woven and film-coated fabric.

Other features and advantages not particularly enumerated below will be apparent after a consideration of the following detail descriptions and the appended claims.

In the drawing,

Fig. 1 is a schematic diagram of an organization of apparatus for practicing the method and for producing the article according to the invention.

Fig. 2 is a greatly magnified view of a section of the finished article.

Fig. 3 is a top plan view of a section of a portion of the finished article.

Fig. 4 is a bottom plan view of Fig. 3.

Referring to Fig. 1, the numeral 10 represents a supply roll of the backing sheet or web 11 which is used during certain stages of the process. The backing sheet, or web 11, may be of any suitable material from which the final composite fabric can be readily stripped mechanically, and for that reason web 11 has a surface which possesses a low degree of adhesive affinity for the film-forming material which constitutes the water-proof part of the finished composite fabric. Web 11 may be a polished metal band or belt of fabric, or paper having a smooth surface treated in any manner well known in the art to provide it with the desired smoothness and inertness against permanent integral bonding to the film-forming material, and heat resistant so as not to be affected by the drying heat and so as to be strippably attached thereto.

The film-forming material 12 is applied to the upper surface of web 11, preferably in the form of a dispersion or, in certain cases, in the form of a solution, the solid constituents of which are finely divided particles approaching colloidal state, which particles will flux together when suitably heated. The dispersion should contain sufficient film-forming solids or particles to give rise to a smooth, non-porous film after the particles are fluxed, and in general the dispersion will have a viscosity of about 100 to 15,000 centipoises when measured at room temperature with a standard viscosimeter, such, for example, as a Brookfield syncro-electric viscosimeter at 20 R. P. M. using a 10x spindle. If the film thickness is to be between 1 mil and 15 mils, the viscosity, as measured above, is preferably between approximately 300 and 2500 centipoises.

The film-forming material is preferably a thermoplastic resinous material either natural or synthetic, and in many cases the use of a polyvinyl type of resin will be found particularly advantageous. Examples of such resins are polyvinyl halides (typified by polyvinyl chloride), polyvinyl esters of the lower aliphatic acids (typified by polyvinyl acetate), polyvinylidene halides (typified by polyvinylindene chloride), the polyvinyl materials exemplified by polyvinyl formal, polyvinyl acetal, and polyvinyl butyral, and polyvinyl alcohol. Of especial advantage for use are polyvinyl chloride and the copolymers of polyvinyl chloride and polyvinyl acetate, in which the chloride content is at least 80%, for example a copolymer of polyvinyl chloride-acetate in the ratio of 96 parts of the chloride to 4 parts of acetate and having an intrinsic viscosity of 1.52. Other examples of synthetic resinous materials that are applicable for use are the polyesters of acrylic and methacrylic acid such as methyl methacrylate resin, the film forming polyamide resins and the copolymers of styrene and butadiene. In place of using a synthetic resinous material, natural or synthetic elastomers, cellulose esters and ethers or polyethylene may be used. Examples of the natural or synthetic elastomers are polyisobutylene (butyl rubber), butadiene acrylonitrile, butadiene-styrene, polyisoprene, latex, natural rubber, the hydrochlorinated derivatives thereof, and chlorinated rubber. Examples of the cellulose esters and ethers are cellulose acetate, nitrocellulose, and ethyl cellulose.

As stated above, the film-forming material is prepared in the form of a dispersion in a medium in which the film-forming particles are substantially insoluble at room temperature, for example, as a plastisol, an organisol, or a latex, as distinguished from a solution thereof. Such dispersions may be prepared by any of the well-known procedures; for example, the film-forming material may be dispersed in a plasticizer with or without a dispersing agent serving as a diluent to form the plastisol or organisol, or it may be dispersed in an aqueous medium to form a latex. Likewise, the dispersion may be produced at the time the film-forming particles are formed, for example by polymerization of the monomeric material previously emulsified in the presence of the aqueous medium. If desired, pigments, fillers, dyes, and the like may be included in the dispersion as is also in accordance with known practices. It will be understood, of course, that the film coating material may be either in the form of a dispersion or in the form of a solution.

The film-forming material 12 can be supplied from any suitable discharge outlet 13 into the trough formed between the metering or doctor roller 14 and the applicator roller 15. The quantity of material 12 applied to applicator roller 15 depends upon the relative setting between rollers 14 and 15, and by adjusting their relative positions, the thickness of the final film can be regulated.

The metered suspension in the form of a sheeted plastic mass on roller 15 is transferred to the web 11 moving in the direction indicated by the arrow. Web 11 is moved by means of a suction apron 16 of well-known design, and by means of the back-up roller 17. The linear speed of web 11 can be varied within a wide range. For example, it can be fed at a linear speed of approximately 100 ft. per minute to approximately 600 ft. per minute, so as to deposit on the web 11 a film of about 0.5 to 4 mils thickness. At this stage of the process, whether a dispersion or solution is used, in order to form a smooth and uniformly dense film, it is necessary to subject the film-forming material on the web 11 to heat or drying. For this purpose, the coated web is passed through one or more heating ovens, or over heating plates (not shown) to remove the volatile components, contained in the suspension or solution to form the desired film. Therefore, when the web leaves the oven 18 it carries the resin film attached to it with a low degree of adhesive affinity.

Therefore, film 19, which by itself might be dimensionally unstable, nevertheless so long as it is strippably attached to the web 11, it retains its dimensional stability. The coated web is then fed past another film applying unit comprised of doctor roller 20, applicator roller 21 and back-up roller 22, similar respectively to rollers 14, 15 and 17. The trough formed between rollers 20 and 21 is supplied with film-forming material 23 which may be similar to the material 12. Thus, when the coated web 11 leaves this second coating unit, there is applied to the pre-cast film 19 another solution or suspension of the film-forming material. It will be understood that the particular manner of applying the film-forming coatings as above described is merely typical and any other well known method, such as knife coating, brush coating, or knife coating dipping, spraying, etc., may be used.

Mounted adjacent to the second coating unit is a supply roll 24 carrying any well known knitted, netted or stretchable open-work textile fabric 25, which is guided through rolls 26, 27 so as to allow the said fabric to rest by its own weight upon the second film 28 which is still in a liquid or semi-liquid form. Because of the adhesive properties of the material 28 while unheated, it adheres both to the pre-cast film 19 and to the open-work or porous material 25. In other words, after the second film-forming coating has been cast onto the exposed surface of the pre-cast or first film 19 and while the second coating 28 is still in a semi-fluid, pasty or tacky state, the strippable porous material 25 is laid onto the coating 28 and sinks into the body of the coating 28. If desired, a light accurately controlled pressure may be applied to the material 25 to bring it into more intimate contact with the coating 28. If desired, the pressure on the material 25, which may be provided by suitable pressure rollers 29, 30, may be such as to force the material 25 to the required depth into the thickness of the coating 28. In any event, since the first coating 19 is now in a dry or cast state, the surface irregularities in the material 25 corresponding to the crests and troughs of the adjacent netted strands cannot penetrate the pre-cast coating 19. Furthermore, any fibers that may extend downwardly through the viscous coating 28 are prevented from passing through the pre-cast coating 19 and thus the finished smooth appearance on the coated side of the fabric is preserved. If the first coating 19 were left in a semi-fluid condition by the time the woven material 25 is laid onto the web, the fabric 25 might sink or be forced entirely through the thickness of the coating 19 and might produce surface irregularities which are undesirable. Thus, by forming the composite material in two successive passes and drying the first pass before laying on the fabric, there is always a resultant minimum depth of smooth plastic on one side of the final product.

After the fabric 25 has been laid on the semi-fluid coating 28, the web 11 with the coatings 19, 28 and with the fabric 25 are fed through a heating oven 31 similar to oven 18, so as to remove any volatile compounds from the coating 28 so as to form the desired film. After leaving the oven 31, the composite material consists of the backing web 11 with the two cast films 19 and 28 and the fabric 25. Integral and permanent adhesion is obtained between the two films 19 and 28 as a result of the natural compatability of the film-forming materials comprised in both films. Fabric 25 is also bonded with permanent adhesion to the film 28 by natural or mechanical adhesion. After leaving the oven 31, the web 11 can be mechanically stripped in any well-known manner from the composite sheet consisting of superposed films 19, 28 and fabric 25, and, if desired, the web 11 can be rerolled on a roller 32 for re-use in the process. The composite sheet is at the same stage rolled on a suitable receiving roll 33. It will be understood, of course, that additional suction-feeding aprons similar to apron 16 may be provided at appropriate points between the roller 17 and the roller 30.

Fig. 2 shows in magnified sectional view a portion of the finished composite article. As will be seen in Fig. 2, one side of the sheet, namely that side corresponding to the film 19, is perfectly smooth and is free from pin holes, while the opposite side exhibits the natural woven character of the fabric 25. Thus, with this process there is no danger of the surface irregularities of the fabric showing up on the face of the smooth film 19, and yet the fabric is anchored or may be imbedded throughout any desired part of its thickness in the film 28. One of the advantages of the above-described process of laying the fabric onto the fluid coating 28 is that, when the web passes through the heating chamber 31, because of the porosity of the fabric 25 and because of this fabric being completely exposed on its outer side, the volatile compounds in the coating 28 can be completely removed without formation of trapped pockets of gaseous material.

Another advantage of the particular process described is that if for any reason pin holes should exist in the first film 19, the application of the second stratum, or coating 28, will seal these pin holes so as to preserve the waterproof character of the finished article. Thus, the stratum 28 serves the double purpose of sealing the film 19 against any accidental pin holes and also acts as a permanent bonding water-proof stratum for the woven fabric.

It will be obvious that the invention is not limited to any particular kind of fabric material 25 and, in general, material 25 may be any strippable, porous material such as textile knitted goods, bias cut woven textiles or non-woven textiles. Furthermore, the film-forming materials for the strata 19 and 28 may be any material of a class of high molecular weight thermo-plastic materials, such as cellulose esters and substituted cellulose, rubber compounds and their derivatives, both natural and synthetic vinyl-polymer and copolymers, vinylidenes and ethylene polymers, and the like. If special properties, such as those of a non-thermoplastic material are required in the finished article, the strata 19 and 28 can be formed of thermo-setting resins, such as polyesters, phenolics, and the like. It will be understood, of course, that whatever film-forming materials are used, their formulation and plasticization can be achieved in the manner well known in the art so as to obtain special properties, such as softness, color and thickness, and the like. The above described process is particularly adaptable to the manufacture of the composite article with printed designs. Thus, prior to applying the first coating 19, the backing 11 can have the desired pattern or design printed thereon by any well-known printing mechanism which uses a printing ink of the vinyl type or any other similar printing ink. As is well known, such vinyl inks may consist of a vinyl resin dissolved in a suitable solvent and containing the desired colored pigment. For example, it may consist of vinyl acetate-chloride copolymer mixed with a suitable plasticizer such as dioctyl phthalate in a suitable solvent, for example methyl ethyl ketone, and a suitable coloring pigment. Consequently, when the composite article is stripped from the backing 11 after leaving oven 31, because of the compatability between the vinyl ink and the coating 19, the said coating carries with it the printed design or pattern from the backing 11.

Other changes and modifications may be made as will be clear to those familiar with the art without departing from the spirit and scope of the invention, it being the intention that all matter contained in the above description shall be treated as illustrative and not in a limiting sense.

What is claimed is:

1. The method of making a water-proof fabric, which comprises applying to a backing member permanently bonded successive coatings of film-forming resin, drying and solidifying one coating before applying the next coating, applying the normally porous fabric on the second coating while the latter alone is still viscous to imbed only one side of the fabric in the second coating and thereby to form a continuous pore-sealing layer without substantial surface distortion of said dried coating, then heating the second coating to form a unitary non-porous composite article comprised of the fabric and both coatings while maintaining a readily strippable adhesive affinity with respect to the backing member.

2. The method according to claim 1 in which both said coatings are of thermo-plastic resin, at least one of which is a vinyl resin.

3. The method according to claim 1 in which both said coatings are of a thermo-plastic resin and said first coating is a vinyl resin.

4. The method according to claim 1 in which both said coatings are of thermo-plastic resin and said first coating is a copolymer of vinyl chloride and vinyl acetate.

5. The method of making a non-porous article of the kind having a fabric base which is normally of openwork construction, which comprises applying a first and continuous coating of a film-forming vinyl resin while it is in a viscouse condition to one side of a backing member whose dimensional stability is much greater than that of said film, removing the volatile constituents of said first coating while causing the remaining constituents thereof to form a dry solidified film which is strippably adherent to said backing with a low degree of adhesive affinity, applying a second continuous coating of a filmforming resin in a viscous condition over said first coating to form a permanent inter-face bond therewith, laying said fabric on said second coating while the latter alone is still viscous to interlock the fabric therewith and to form a continuous pore-sealing layer for said fabric on one side only thereof, the opposite side of the fabric retaining its normal surface characteristics, and evaporating the volatile constituents of the second coating to form a unitary and permanent bond with the first coating and with said fabric.

6. The method of making a non-porous article of the kind having a fabric base of normally porous construction which comprises, applying a first coating of a film-forming vinyl resin while it is in a viscous condition to one surface of a backing member whose dimensional stability is much greater than that of said fabric, removing the volatile constituents of said first coating while causing the remaining constituents thereof to form a dry solidified and water-proof film of predetermined minimum thickness which is strippably attached to said backing with a low degree of adhesive affinity, applying a second coating of a film-forming resin in a viscous condition over said first coating to form an inter-face permanent bond therewith, laying said fabric on said second coating while the latter alone is still viscous to permanently interlock the fabric therewith and to form a continuous pore-sealing layer for said fabric on one side only thereof, the opposite side of the fabric retaining its normal fabric surface characteristics, and evaporating the volatile constituents of the second coating to form a permanent bond between said fabric and both said coatings, but without any substantial planar distortion of said first coating, and without any substantial interpenetration of said second coating into the pores of said fabric.

7. The method of making a water-proof fabric, which comprises applying in a viscous condition to a backing member successive film-forming vinyl resin coatings, heating and drying the first coating before applying the next coating so as to form a dry and solidified vinyl film which is strippably attached with a low degree of adhesive affinity to said backing member, applying the next coating in viscous condition to the first solidified coating, applying the normally porous fabric to said second coating while it is still viscous to cause said second coating to bridge the pores of said fabric but without substantial filling of said pores by said second coating and without any substantial distortion of said second coating, and drying the second coating to form a unitary composite article consisting of the fabric and both coatings which article is readily strippable as a whole from said backing.

8. The method of continuous formation of a waterproof fabric, which comprises casting a first coating of a film-forming resin on a moving backing web to form on said web a dry solidified film having a low degree of adhesive affinity with said backing so as to be readily mechanically stripped from said backing but allowing said film to retain the dimensional stability of said web while attached thereto, applying in viscous form a second film-forming resin coating to the first coating, applying an open-work fabric to said second coating while the latter is still viscous, subject the fabric and second coating to a limited pressure to imbed only a limited cross-section of the fibres of said fabric in said second coating and without any substantial distortion of said second coating, and then drying the second coating to form a unitary composite article with the first coating and fabric which article is readily strippable as a unit from said backing without distortion of said films.

9. A water-proof fabric comprising a body section of open-work material having raised portions over its surface formed by the fabric strands, an intermediate vinyl film bonded to said ridges whereby said film is substantially flat except at limited regions where it is engaged by said raised portions, said intermediate film having substantially negligible inter-penetration of the pores of said fabric, and an outer vinyl film integrally bonded as a unit to said intermediate film, said outer film being substantially entirely free from protruding fibres of said fabric.

10. The hereindescribed method of making a waterproof fabric which comprises, casting a first vinyl film with strippable adhesive attachment to a supporting backing, applying a second vinyl film in viscous state to said first film, laying the open-work fabric material on the second film while said second film is still in a viscous state, subjecting the fabric and second film to a limited pressure to imbed only a limited portion of the cross-section of the fibres of said fabric in said second coating while enabling said first coating to retain its substantially flat condition and without substantial inter-penetration of the fabric pores by said second coating, and drying the said second coating to bond it integrally to the first coating and to said fabric.

11. A process for coating sheet materials comprising the steps of applying a film of coating material to the upper surface of a carrier strip, applying adhesive to the film of coating material on the carrier strip and then immediately rolling a sheet material onto the adhesive carrying film of coating material and bonding said sheet material to the latter, and separating said carrier sheet from the lamination formed by said film of coating material and the sheet material bonded thereto.

12. A process for coating sheet materials comprising the steps of applying a low viscosity film of coating material to the upper surface of a carrier strip, solidifying said film of coating material on the carrier strip, applying adhesive to the solidified film of coating material on the carrier strip and then immediately rolling a sheet material onto the adhesive carrying film of coating material and setting said adhesive to bond said sheet material to said film of coating material, and separating said carrier strip from the lamination formed by said film of coating material and the sheet material bonded thereto.

13. A process for coating fabric comprising the steps of applying a film of thermo-setting plastic in liquid condition to the upper surface of a carrier strip, heating said film to effect the solidification thereof, applying an adhesive to the solidified film on the carrier strip and then immediately rolling a fabric onto the adhesive carrying surface of the plastic film, setting the adhesive to bond said fabric to the plastic film, and separating said carrier strip from the lamination formed by said plastic film and the fabric bonded thereto.

14. A process for coating fabric comprising the steps of applying a film of vinyl resin in liquid condition to the upper surface of a carrier strip, heating said film to effect the solidification thereof, applying a vinyl resin adhesive in liquid condition to said solidified film on the carrier strip, pressing a fabric onto the adhesive carrying surface of said film prior to setting of the adhesive, heating said fabric, adhesive and film on the carrier strip to set the adhesive and bond said fabric to the film, and separating said carrier strip from the lamination formed by said film and said fabric bonded thereto.

15. A process for coating fabric comprising the steps of passing a carrier strip formed of release paper horizontally below a hopper discharging a thermo-setting coating material in at least semi-liquid condition, spreading the discharged coating material to provide a relatively thin film thereof on the top surface of the carrier strip, heating said film to effect solidification thereof, applying a flowing film of thermo-setting adhesive on top of the solidified film of coating material, bringing a fabric into contact with the adhesive carrying surface of said film of coating material while the adhesive is still in a flowing condition and passing said fabric, coating material and carrier strip through pressure rollers and then through a heated zone to set the adhesive and provide a firm bond between said fabric and said film of coating material, and separating said carrier strip from the lamination formed by said film of coating material and the fabric bonded thereto.

16. A process for coating sheet materials comprising the steps of applying a pigmented impression to a carrier strip having little affinity for the impression, applying a film of coating material onto said strip over the pigmented impression, adhering a sheet material to said film of coating material on the carrier strip, and separating said carrier strip from the lamination formed by said film of coating material and the sheet material adhering to the latter so that the pigmented impression is transferred to the exposed surface of said film of coating material.

References Cited in the file of this patent

UNITED STATES PATENTS

| | | |
|---|---|---|
| 1,694,258 | Hartong | Dec. 4, 1928 |
| 2,067,488 | Hough | Jan. 12, 1937 |
| 2,077,617 | Cramer | Apr. 20, 1937 |
| 2,255,953 | Vergobbi | Sept. 16, 1941 |
| 2,407,549 | Gurwick | Sept. 10, 1946 |
| 2,548,872 | Cross | Apr. 17, 1951 |
| 2,556,078 | Francis | June 5, 1951 |
| 2,576,491 | Ulano | Nov. 27, 1951 |
| 2,628,929 | Persoon et al. | Feb. 17, 1953 |
| 2,631,958 | Francis | Mar. 17, 1953 |

FOREIGN PATENTS

| | | |
|---|---|---|
| 622,996 | Great Britain | May 11, 1949 |